(12) United States Patent
Hottgenroth

(10) Patent No.: US 6,950,921 B2
(45) Date of Patent: Sep. 27, 2005

(54) METHOD FOR OPERATING AN INTEGRATED MEMORY UNIT PARTITIONED BY AN EXTERNAL CONTROL SIGNAL

(75) Inventor: Dirk Hottgenroth, München (DE)

(73) Assignee: Infineon Technologies AG, Munich (DE)

( * ) Notice: Subject to any disclaimer, the term of this patent is extended or adjusted under 35 U.S.C. 154(b) by 208 days.

(21) Appl. No.: 10/082,556

(22) Filed: Feb. 25, 2002

(65) Prior Publication Data

US 2002/0129197 A1 Sep. 12, 2002

(30) Foreign Application Priority Data

Feb. 23, 2001 (DE) ......................................... 101 08 820

(51) Int. Cl.[7] .............................................. G06F 12/00
(52) U.S. Cl. ...................................... 711/173; 711/219
(58) Field of Search ............................... 711/173, 219, 711/167, 105, 211; 365/230

(56) References Cited

U.S. PATENT DOCUMENTS

| 5,327,390 A | | 7/1994 | Takasugi | |
|---|---|---|---|---|
| 5,357,623 A | * | 10/1994 | Megory-Cohen | 711/129 |
| 5,619,471 A | * | 4/1997 | Nunziata | 365/230.03 |
| 5,801,554 A | | 9/1998 | Momma et al. | |
| 6,021,478 A | * | 2/2000 | Kerstein et al. | 711/167 |
| 6,381,676 B2 | * | 4/2002 | Aglietti et al. | 711/133 |
| 6,385,113 B1 | * | 5/2002 | Longwell et al. | 365/222 |
| 6,646,941 B1 | * | 11/2003 | Atwell et al. | 365/222 |

OTHER PUBLICATIONS

Reese, E. et al.: "A 4K×8 Dynamic RAM with Self–Refresh", IEEE, vol. SC–16, No. 5, Oct. 1981, pp. 479–487.

* cited by examiner

Primary Examiner—Kevin Verbrugge
(74) Attorney, Agent, or Firm—Laurence A. Greenberg; Werner H. Stemer; Ralph E. Locher

(57) ABSTRACT

A method for operating an integrated memory unit having a memory cell field includes the steps of, before a memory access, partitioning the memory cell field into a plurality of memory areas, for memory access, selecting one of the memory areas through the application of a memory area address, during the memory access, and internally generating addresses for access to memory cells of the one of the memory areas by the memory unit. Through a common external terminal connection of the memory unit, the memory area addresses are transmitted, and, subsequently, access data of the one of the memory areas are transmitted successively. The operating method enables a comparatively low number of terminal tendons.

12 Claims, 2 Drawing Sheets

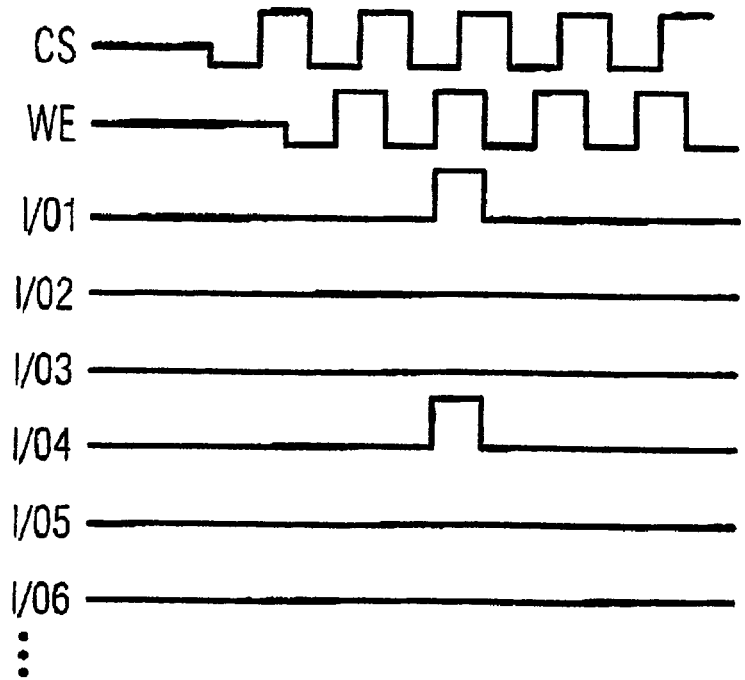
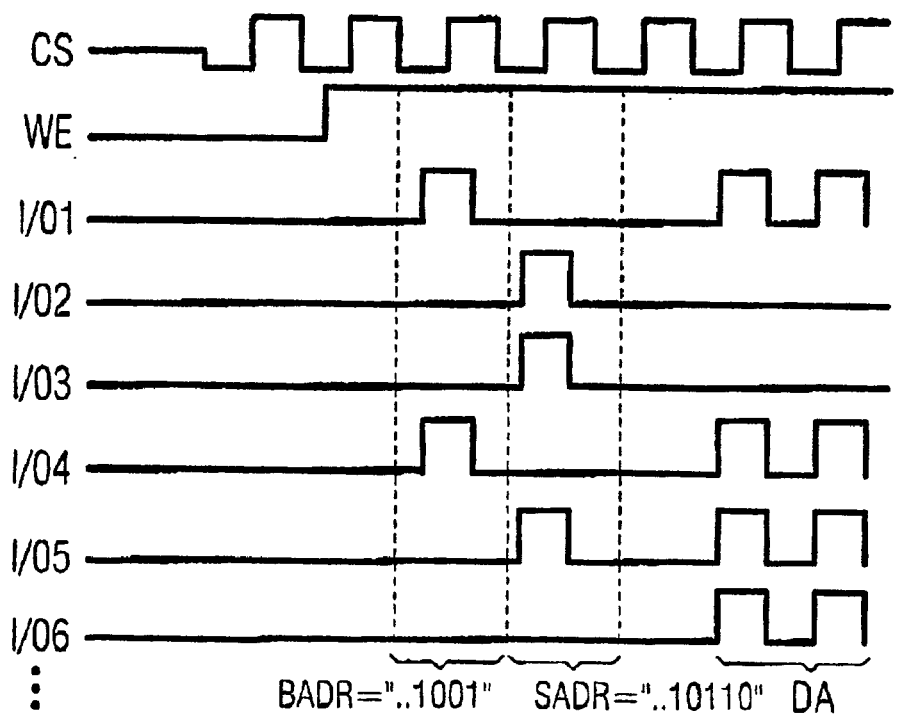

METHOD FOR OPERATING AN INTEGRATED MEMORY UNIT PARTITIONED BY AN EXTERNAL CONTROL SIGNAL

BACKGROUND OF THE INVENTION

Field of the Invention

The invention lies in the field of integrated circuits. The invention relates to a method for operating an integrated memory unit.

For the operation of an integrated memory unit, for example, a DRAM memory unit, in general, an instruction set and an addressing are required; in processing, in connection with one another, these are often referred to as a protocol. The instruction set and the addressing of particular memory subareas that are to be written or to be read, for example, of a dynamic memory unit, are today generally possible with great flexibility; cf. what is referred to as the SDRAM protocol or the RAMBUS protocol. The high degree of flexibility and the ability to address individual memory cells, or a small group of memory cells, from a large collection of memory cells, alone and under varying conditions, is, in general, accompanied by a correspondingly high degree of complexity.

Thus, for example, for a 64 MB chip, besides the signal pins for the actual data transmission, for example, approximately 5 to 10 additional pins are required for commands and reference voltages, as well as 10 to 15 additional pins for the addressing, and one to four pins for timing signals, commonly referred to as clocks. The number of terminal connections is, therefore, comparatively large, which, in general, also increases the manufacturing costs of the packaging. Moreover, it is necessary to test a very large number of functions and combinations of functions of the memory chip for correct functioning before delivery in order to supply the customer with a product that functions under all conceivable conditions of use.

SUMMARY OF THE INVENTION

It is accordingly an object of the invention to provide a method for operating an integrated memory unit that overcomes the hereinafore-mentioned disadvantages of the heretofore-known devices and methods of this general type and that enables a comparatively low number of terminal pins.

With the foregoing and other objects in view, there is provided, in accordance with the invention, a method for operating an integrated memory unit having a memory cell field, including the steps of, before a memory access, partitioning the memory cell field into a plurality of memory areas, for a memory access, selecting one of the memory areas by applying a memory area address, during the memory access, internally generating addresses with the memory unit for the access to memory cells of one of the memory areas, and transmitting the memory area address, and, subsequently and successively, transmitting access data of the one of the memory areas through a common external terminal connection of the memory unit.

The method for operating an integrated memory unit has a memory cell field in which the memory area address, and subsequently, one after the other, access data of the one of the memory areas, are transmitted through a common external terminal connection of the memory unit.

The invention makes it possible to reduce a high number of required external terminal connections, or pins, in that, a memory area address for a memory access, and subsequently, one after the other, access data of the relevant memory areas, are transmitted through at least one common external terminal connection of the memory unit (referred to as multiplexing of an address, with a very large number of subsequent access data at one pin). The addresses for the access to memory cells of the relevant memory area are generated during the memory access, for example, by an internal counter inside the memory unit. Such a process makes it possible to provide an interruption-free stream of access data at the data pins.

In accordance with another mode of the invention, a number to be determined of the memory areas, or, alternatively, a size of the respective memory areas, is transmitted with an initialization command. For example, the memory cell field is subdivided into memory areas of uniform size. It is thereby advantageous if the size of the area can be varied with the initialization.

In accordance with an added mode of the invention, an interrupt command for one of an interruption and a termination of the memory access is transmitted at a time defined by the interrupt command.

In accordance with an additional mode of the invention, a selection signal is applied to the memory unit, by which at least two commands for the memory access are transmitted. As such, the number of command pins can be reduced, which reduces the overall number of pins required for data and commands. Such a selection signal is, for example, suitable for distinguishing between reading and writing of access data. A read command and a write command can, thus, alternatively be transmitted with the same selection signal. Preferably, the initialization command is additionally transmitted by the selection signal.

With the inventive method, the flexibility of a memory access is limited to a certain extent, which should be weighed against the fact that the inventive operating method enables a reduced power consumption, lowers demand on the testing of the memory chip, and allows a normally preferred transfer of large quantities of data successively, without constant jumping of the addresses or frequent changeovers between reading and writing.

In addition, with the invention it is possible to carry out a masking of data, as in conventional memory units. It is likewise possible to introduce a termination of a read or write cycle. For these purposes, an interrupt command is advantageously transmitted for the interruption or termination of the memory access at a time defined by the interrupt command. The interrupt command can advantageously be transmitted with the above-described selection signal. As such, no additional pin is necessary for the interrupt command. With the interrupt command, it is possible to terminate the writing, or reading, at an arbitrary point. Through the activation in the meantime of a masking signal, it would also be possible to mask individual data; i.e., not to transmit into or out of the memory the corresponding access data, adjacent to the data pins, for the access cycle. The masking signal can also advantageously be transmitted with the above-described selection signal.

In accordance with yet another mode of the invention, a readout command and a write command are transmitted through the selection signal.

In accordance with yet a further mode of the invention, an initialization command, an interrupt command, and/or a masking signal is transmitted through the selection signal.

In accordance with yet an added mode of the invention, an activation signal is applied to each of the memory units for an activation of the respective memory unit given an operation of a plurality of memory units at a common data bus.

In accordance with yet an additional mode of the invention, the activation signal is additionally or simultaneously used as a timing signal for operation of the respective memory unit.

In accordance with again another mode of the invention, the memory units are operated at a common data bus and an activation signal is applied to each of the memory units for an activation of the respective on e of the memory units.

Advantageously, to be able to execute a start of a read or write operation at an arbitrary address of the memory unit, in accordance with a further mode of the invention, a start address is transmitted for the memory access, and, beginning with the address, the addresses are generated for the access to the memory cells of the relevant memory area.

In accordance with a concomitant mode of the invention, the method is executed only in a test mode of the memory unit for testing a functionality of the memory unit.

The operating mode executed using the inventive method can be used both for a memory unit intended separately for such a purpose, and also in addition to the already-existing operating modes of conventional memory units. In the latter case, it would be possible either to specify the operating mode to the customer or to build it in only as a test mode. In a test mode, the inventive method would make the testing of the memory unit before delivery easier for the manufacturer. Fewer pins are required for the test phase, enabling a savings of resources at the test apparatus. Moreover, the parallelism can be increased during the testing of the functionality of a plurality of memory units, which advantageously reduces the expense for test operation.

Other features that are considered as characteristic for the invention are set forth in the appended claims.

Although the invention is illustrated and described herein as embodied in a method for operating an integrated memory unit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 3 is a signal flow diagram for an initialization of a memory unit according to the invention; and FIG. 4 is a signal flow diagram for a write access to a memory unit according to the invention.

DESCRIPTION OF THE PREFERRED EMBODIMENTS

Figure 1:
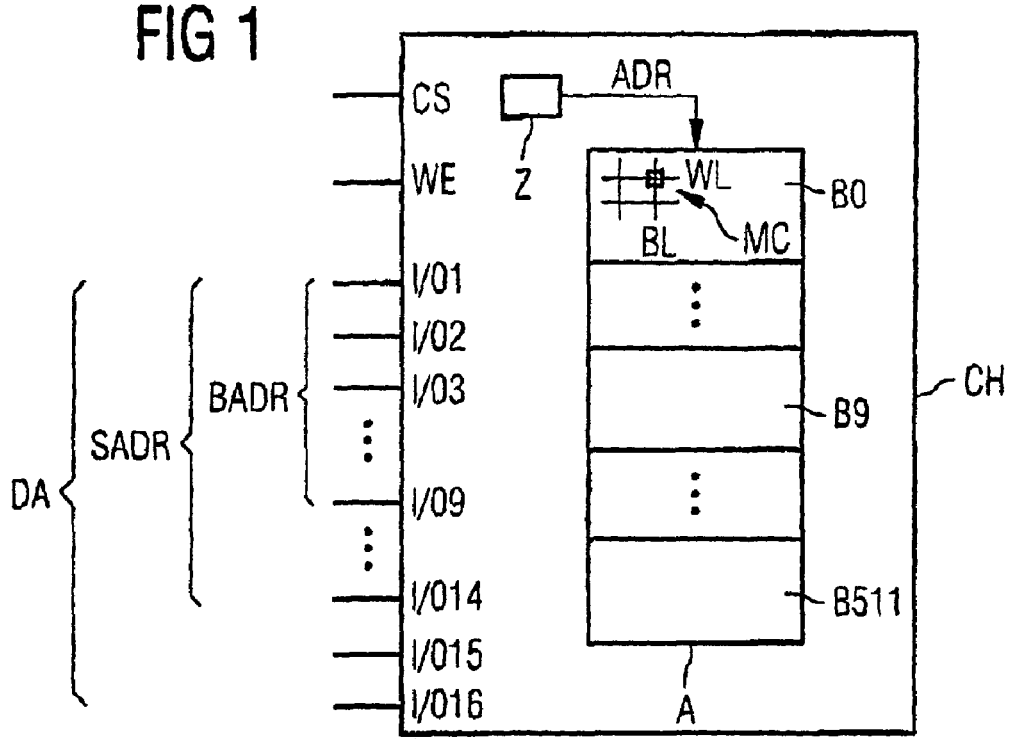
FIG. 1 is a block circuit diagram of a specific embodiment of a memory chip according to the invention.

Referring now to the figures of the drawings in detail and first, particularly to FIG. 1 thereof, there is shown a specific embodiment of a memory chip CH that has a memory cell field A. In the example, memory chip CH is a 64 MB memory chip. Memory chip CH has 16 data terminal connections I/O1 to I/O16. Chip CH thus has $64 \times 1024 \times 1024/16 = 2^{26}/2^4 = 2^{22} = 4 \times 1024 \times 1024$ addresses.

Memory cell field A has wordlines WL and bitlines BL, at whose crossings memory cells MC are situated. By the wordlines WL, memory cells MC are respectively selected through a selection transistor, and the access data that are to be read out or written in are read or written through bitlines BL. For a memory access, memory cell field A is partitioned into 512 memory areas B0 to B511. Each of the 512 memory areas B0 to B511 accordingly contains $4 \times 1024 \times 1024/512 = 8192$ addresses.

In the memory unit CH, only two terminal connections are still used for command signals CS and WE. Signal CS corresponds to what is called a chip select signal, with which the chip can be selected. The activation signal CS is at the same time a timing signal for the operation of memory unit CH. Such a clock signal is required for the operation, for example, of an SDRAM memory unit. Distinguishing between a read access and a write access takes place using selection signal WE. A third non-illustrated terminal connection can supply a reference level for the incoming data signals, for example, in the form of a reference voltage as a boundary between "high" and "low" voltage levels on the data lines. The reference level can, however, also be produced internally from a supply voltage by a voltage divider. The reference voltage has, for example, half the magnitude of the supply voltage.

Before a memory access, an initialization of memory unit CH is carried out. In this regard, FIG. 3 shows an exemplary signal flow diagram for the initialization of the memory unit. Through activation signal CS, which begins to run as a timing signal, the chip is selected. The initialization is introduced with an initialization command that is transmitted by selection signal WE. In a specific embodiment, selection signal WE has such a purpose the signal sequence "10101010." The signal sequence is interpreted as an initialization command with which at the same time memory cell field A is partitioned into the 512 memory areas B0 to B511.

For such a purpose, the logarithm to the base 2 of the number of memory areas that are later to be accessed in block-by-block fashion is transmitted through terminal connections I/O1 to I/O4. In such a case, the logarithm to the base 2 from the number 512 is: $\log 2 (512) = 9$; i.e., "1001" in binary notation. The binary information is correspondingly transmitted to terminal connections I/O4, 3, 2, 1. All further I/Os are "0". Accordingly, the number of memory areas to be defined is communicated to the memory unit, from which there results the size of the individual memory areas, which are all of equal size. Alternatively, it would be possible to communicate the size of one memory area, from which the number of memory areas to be defined would result.

An exemplary write access to the memory unit from FIG. 1 is shown based upon the signal flow diagram according to FIG. 4. Here, the chip is again selected through activation signal CS, which begins to run as a timing signal. Selection signal WE goes from the high-impedance state ("high-Z") to the state "1" ("high"). Accordingly, the write mode is selected. For the memory access, memory area addresses BADR are applied to I/Os 1 to 9 for the selection of memory area B9. Subsequently, data signals are to be written to the area B9. For the selection of area B9, "1001" (binary representation of 9) is applied to I/Os 4 to 1. The remaining I/Os are set to "0."

Subsequently, in the specific embodiment, a start address inside area B9 is selected a defined number of clock cycles later. The writing inside the area is to begin at such a start address. The 8192 addresses inside a respective area are addressed as start addresses through terminal connections I/O1 to 14. In the example, "10110" (binary representation of 22) is applied to terminal connections I/O5 to I/O1. The remaining I/Os are at "0." Starting from such a start address SADR, addresses ADR are generated by a counter Z for the access to memory cells MC of memory area B9.

A defined number of CS cycles later, the write data are provided at the I/Os and are taken over by chip CH. Write data DA are thereby transmitted successively in a rapid sequence. These data are then stored in memory unit CH.

If the internal address counter has reached the end of memory area B9, selection signal WE again goes to "high-Z," which terminates the write cycle. For the case in which selection signal WE remains in the state "high," the next memory area address BADR is applied.

If it is not desired to run through all addresses up to the end of memory area B9, an interrupt command is transmitted for the interruption or termination of the memory access at a time defined by the interrupt command. The interrupt command is advantageously likewise transmitted by selection signal WE, which for such a purpose runs through, for example, the signal sequence "010-high-Z." For the interruption, or masking, of particular data, it would be possible to mask individual data in a targeted manner by, in the meantime, switching WE to "high-Z", i.e., not incorporating into the chip the corresponding data adjacent to the I/Os for such an access cycle.

For a read access, the sequence is similar to the sequence described above for a write cycle. In the read access, selection signal WE does not go to "1," but rather to "0." The state, thus, represents a corresponding read command. For termination, selection signal WE correspondingly runs through the signal sequence "101-high-Z" or the like.

The inventive operating method functions both for simple data rates and for doubled data rates, in which one datum is transmitted per clock pulse edge of signal CS, as shown in FIG. 4. For the chip manufacturer, it is advantageous that it is left to the individual chip construction to determine how the data that are to be read or written are distributed in the chip. This enables, in particular, the selection of an operating mode having a low power consumption (e.g., what is referred to as "fast page mode" in dynamic memory units), and the avoidance to the greatest possible extent of critical internal timings. Accordingly a low probability of failure of the memory chip results.

Figure 2:
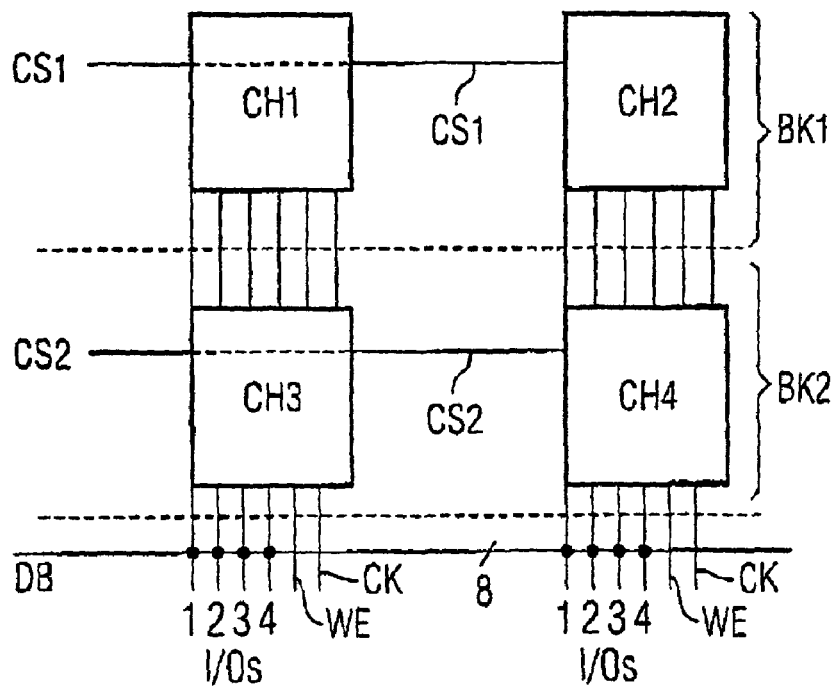
FIG. 2 is a schematic and block circuit diagram of a system of a plurality of memory chips that are connected to a common data bus.

FIG. 2 illustrates a system in which a plurality of memory chips CH1 to CH4 are connected to a common data bus DB. Memory chips CH1 and CH2 form what is referred to as a memory bank BK1. Memory chips CH3 and CH4 form a memory bank BAD. Activation signals CS1 and CS2 are connected to memory units CH1, CH2, or CH3, CH4. Memory units CH1 to CH4 are operated in parallel at data bus DB, whereby, for example, chips CH1, CH3 supply the high-order bits and chips CH2, CH4 supply the low-order bits of data bus DB.

In the variant according to FIG. 2, signals CS1 and CS2 take over only the function of an activation signal. The memory chips each have an additional pin for a timing signal CK that takes over the function of a clock. Such a configuration is advantageous for the case in which a coupling or interlinking of signal CS with a timing signal is regarded as undesirable because a stable clock should, in fact, run continuously for reasons of phase stabilization.

The curves shown in the signal flow diagrams of FIGS. 3 and 4 are exemplary specific embodiments. In particular, the chronological distances between the individual addresses, or from the addresses to the access data, are given only as examples. These depend, in particular, on the frequencies used and on the respective chip configuration. Moreover, various command sequences by CS and WE are possible for the realization of the reduced instruction set. The command sequences described based upon the figures are only examples. Because only a few different access types are possible, advantageously reduced demands result for a test mode of the memory unit for testing the functionality of the memory unit.

I claim:

1. A method for operating an integrated memory with a reduced number of external terminal pins including a counter for internally generating addresses and a memory cell field being able to be divided into a number of memory areas of uniform size, which comprises:

receiving a control signal from outside the integrated memory unit with the external terminal pins;

before a memory access, partitioning the memory cell field into a plurality of memory areas, the uniform size of the memory areas or the number of the memory areas being dependent on the control signal;

for the memory access, selecting one of the memory areas by applying a memory area address to the external terminal pins;

for the memory access, selecting one of the memory cells inside the selected one of the memory areas by applying a memory cell address to the external terminal pins;

activating the selected one of the memory cells inside the selected one of the memory areas for a write/read access;

writing/reading data in/out of the selected one of the memory cells;

generating a further memory cell address, subsequent to the memory cell address of the memory cell on which the last write/read access was carried out, by the counter of the integrated memory for selecting a further memory cell in the selected one of the memory areas;

performing a further write/read access in the selected one of the memory areas until the further write/read access is interrupted by an interrupt command or the further memory cell address is the last memory cell address inside the selected one of the memory areas, by repeating the following steps:

activating the further selected one of the memory cells for the further write/read access;

writing/reading data in/out of the further selected one of the memory cells;

generating a further memory cell address, subsequent to the memory cell address of the memory cell on which the last write/read access was carried out, by the counter of the integrated memory for selecting a further memory cell in the selected one of the memory areas, or applying an interrupt command to the external terminal pins at a time defined by the interrupt command in order to interrupt the write/read access in the selected one of the memory areas.

2. The method according to claim 1, which further comprises:

applying a selection signal to the memory unit; and transmitting at least two commands for the memory access by the application of the selection signal to the memory unit.

3. The method according to claim 2, which further comprises transmitting a readout command and a write command through the selection signal.

4. The method according to claim 2, which further comprises transmitting at least one of an initialization command, an interrupt command, and a masking signal through the selection signal.

5. The method according to claim 3, which further comprises transmitting at least one of an initialization command, an interrupt command, and a masking signal through the selection signal.

6. The method according to claim 1, which further comprises applying an activation signal to each of the memory units for an activation of the respective memory unit given an operation of a plurality of memory units at a common data bus.

7. The method according to claim 6, which further comprises additionally utilizing the activation signal as a timing signal for operation of the respective memory unit.

8. The method according to claim 6, which further comprises simultaneously utilizing the activation signal as a timing signal for operation of the respective memory unit.

9. The method according to claim 1, which further comprises:

operating memory units at a common data bus; and applying an activation signal to each of the memory units for an activation of the respective one of the memory units.

10. The method according to claim 9, which further comprises additionally utilizing the activation signal as a timing signal for operation of the respective memory unit.

11. The method according to claim 9, which further comprises simultaneously utilizing the activation signal as a timing signal for operation of the respective memory unit.

12. The method according to claim 1, wherein the method is performed only in a test mode of the memory unit for testing a functionality of the memory unit.

* * * * *